United States Patent [19]

Raissyan et al.

[11] Patent Number: 5,703,935
[45] Date of Patent: Dec. 30, 1997

[54] AUTOMATED TELEPHONE OPERATOR SERVICES

[75] Inventors: Anousheh Raissyan, Plano, Tex.; Kody Raymond Wood, Micthellville, Md.; Michael Joseph Jacobi, Shellsburg, Iowa; Linda S. King, Washington, D.C.; Lee Chopek Seydel, Iowa City, Iowa; Michele Pauline Torbert, McLean, Va.; Robert Gary Leonard, Plano, Tex.

[73] Assignee: MCI Communications Corporation, Washington, D.C.

[21] Appl. No.: 219,577

[22] Filed: Mar. 29, 1994

[51] Int. Cl.[6] .................. H04M 1/64; H04M 3/50
[52] U.S. Cl. ................ 379/88; 379/127; 379/142; 379/211; 379/214; 379/223
[58] Field of Search .................... 379/67, 88, 89, 379/84, 144, 112, 214, 70, 132, 223, 142, 212, 127, 120, 121

[56] References Cited

U.S. PATENT DOCUMENTS

| | | | |
|---|---|---|---|
| 4,827,500 | 5/1989 | Binkerd et al. | 379/88 |
| 4,850,000 | 7/1989 | Marino et al. | 379/67 |
| 4,920,558 | 4/1990 | Hird et al. | 379/67 |
| 4,922,519 | 5/1990 | Daudlin | 379/67 |
| 4,958,366 | 9/1990 | Hashimoto | 379/70 |
| 5,003,584 | 3/1991 | Bonyacar et al. | 379/119 |
| 5,007,078 | 4/1991 | Masson et al. | 379/70 |
| 5,020,095 | 5/1991 | Morganstein et al. | 379/214 |
| 5,093,858 | 3/1992 | Hird et al. | 379/144 |
| 5,163,086 | 11/1992 | Ahearn et al. | 379/144 |
| 5,181,237 | 1/1993 | Dowden et al. | 379/212 |
| 5,185,781 | 2/1993 | Dowden et al. | 379/89 |
| 5,187,735 | 2/1993 | Garcia | 379/211 |
| 5,210,789 | 5/1993 | Jeffus et al. | 379/223 |
| 5,222,125 | 6/1993 | Cresswell et al. | 379/67 |
| 5,287,403 | 2/1994 | Atkins et al. | 379/144 |
| 5,309,505 | 5/1994 | Szlam et al. | 379/266 |
| 5,319,701 | 6/1994 | Hird et al. | 379/132 |
| 5,335,266 | 8/1994 | Richardson, Jr., et al. | 379/88 |
| 5,355,403 | 10/1994 | Richardson, Jr., et al. | 379/88 |
| 5,392,343 | 2/1995 | Davitt et al. | 379/212 |
| 5,418,844 | 5/1995 | Morrisey et al. | 379/216 |
| 5,434,906 | 7/1995 | Robinson et al. | 379/212 |
| 5,483,582 | 1/1996 | Pugh et al. | 379/144 |

OTHER PUBLICATIONS

IBM Corp. Bulletin., Speech–to–Speech Translator for Natural Language, vol. 37, Feb. 94, pp. 137–140.
IEEE Communications Mag., Automation of Alternate Billed Calls Using Speech Recognition. Jan. 1991 pp. 25–30.

Primary Examiner—Fan Tsang

[57] ABSTRACT

A system and method for automatically processing telephone calls for alternative billing or for providing automated operator services. In one form, a call for which operator or alternative billing services are sought is routed through a telephone network to an automated operator facility. The call is accompanied by certain parameters which are indicative of the characteristics of the call. A menu of available automatic services is presented to the caller and the caller's selection from the menu is then received by the automated facility. The call parameters are used to retrieve a record containing customization features, preselected by a subscriber, which are those to be used in providing the particular service selected from the menu by the caller. The call is then automatically processed in accordance with the preselected customized features to provide the selected operator servile. During a call session the caller may dynamically select certain features such as the language in which the interactive portions of the call processing will be conducted.

15 Claims, 15 Drawing Sheets

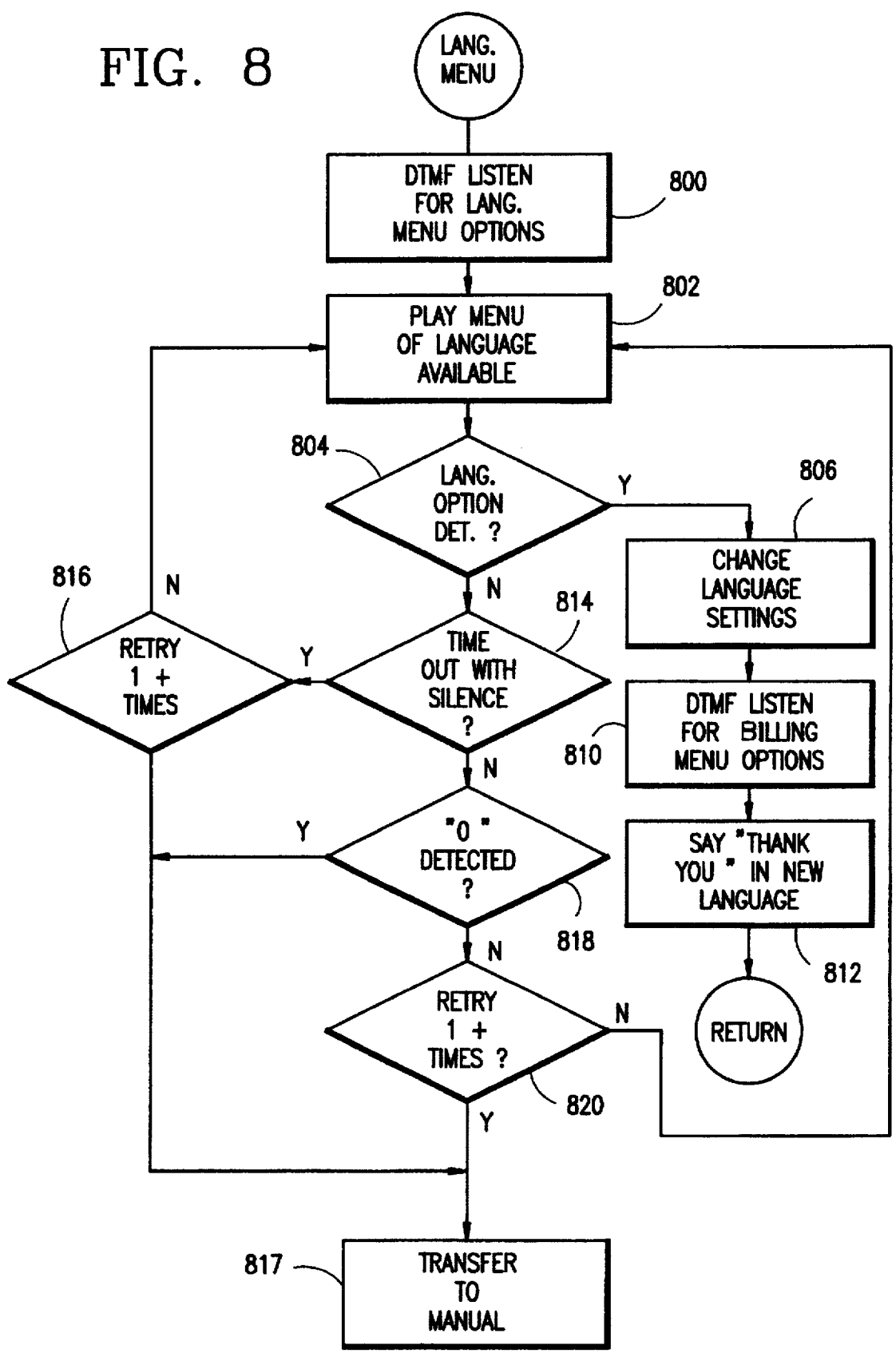

AUTOMATED TELEPHONE OPERATOR SERVICES

This invention pertains in general to the field of telephony and in particular to methods and apparatus for automating telephone operator services.

BACKGROUND OF THE INVENTION

Various items of equipment and techniques, useful with and within a telephone network or system, are now available to conduct call processing automatically and interactively with a caller for a number of applications. For example, it is commonplace to have a telephone call automatically responded to by a voice recording which presents the caller with prompts for inputs and with a menu from which call routings and services may be selected. The caller responses may be made vocally (using automatic voice recognition), by entries from the telephone keypad, or by a combination of techniques. An advantage of this, from an economic and efficiency point of view, is that there is no need for human intervention in handling the call.

Despite the advances that have been made, however, there remains a need to improve the automation of certain calls which have historically been made with the assistance of a telephone operator. For example, long distance calls sought to be alternatively billed, either to the called party (e.g., collect calls) or to a third party (e.g., third party billing) still require, by and large, the personal assistance of a telephone operator. In these cases, prior to completing the call, the operator has to establish initial contact with either the called party or the third party and ascertain whether or not the charges for the call will be accepted. Then, depending on whether the charges are accepted or not, the operator informs the calling party, one way or the other, and the ball is then placed by the operator or is denied. For the same reasons of economy and efficiency, it has become desirable to find some way to automate these alternative billing procedures, eliminating the need for operator assistance. Some advances have been made in that regard and automated systems are beginning to appear.

Despite the advances in automation, however, certain capabilities have been lacking, and it has been recognized, in connection with these kinds of telephone services, that various customers, or subscribers, may need to be responded to and their calls processed differently, depending on their particular circumstances and requirements. For example, certain subscribers seeking operator services may need to be responded to in a particular language (i.e., other than English), or, if the subscriber is a business, such as a hotel, it may desire to respond to a caller with customized greetings or closings or to provide music or special messages during call interludes or holding periods. Thus, not only have ways been sought to automate these and other operator services, but it has been desirable to find some way to allow a subscriber to customize automated services to meet their particular requirements. In fact, ways have been sought whereby a user can dynamically obtain a certain amount of "customization" during a call session; i.e., while the user is setting up the call. Preferably, the "dynamic" customization would complement or override any preselected customization.

It is, therefore, among the objects of the present invention to provide a system and method whereby certain telephone services, including those requiring alternative billing, are processed automatically, without operator intervention, and whereby certain features and aspects of the services may be customized to meet a subscriber's particular requirements and certain other features may be "dynamically" selected by a caller, or user, during a particular call session.

SUMMARY OF THE INVENTION

In one form of the invention, a call for which operator or alternative billing services are sought is routed through a switched telephone network, for example, to an automated operator facility. The call is accompanied by certain parameters which are indicative of the call's characteristics (i.e., indicative of the type of call). A menu of available automatic services is presented to the caller and the caller's selection from the menu is then received by the automated facility. The call parameters are used to retrieve a record containing customization features, preselected by a subscriber, which are those which are to be used in providing the operator service selected from the menu by the caller. The call is then automatically processed in accordance with the preselected customized features to provide the selected operator service. During a call session the caller may dynamically select certain features such as the language in which the interactive portions of the call processing will be conducted.

In another form of the invention, once a call for which operator or alternative billing services are sought has been routed to a point from which automated services are available, certain parameters, defining the type of call received, are examined to determine whether automated telephone services are available for that type of call. If so, the call, along with at least some of the call parameters, are directed to an automatic response unit for processing. A menu of automated services is presented to the calling party allowing certain services to be selected. The call parameters are examined by the automatic response unit to determine which particular features from a plurality of call features will be used for processing the call in accordance with the selected service. Selection may be by voice response or by activation of the telephone keypad. The automated services available may include collect calling, third party billing of calls, and billing calls to a credit account or card. The particular features employed to process the call (for the selected service) are preselected by a subscriber for the automated services and include such things as preselection of the spoken language used in the interexchange with a caller and the provision of selected music or messages while a party is on hold during call processing.

A system according to the invention for automatically processing calls for alternative billing, or for providing automated operator services, may include an automatic response device (e.g., an ARU) for receiving calls sought to be billed alternatively and for processing accordingly. The automatic response unit may include a voice response subsystem that receives call related inputs and makes appropriate responses and a call processing subsystem that interacts with the voice response part to control the progression of call processing. A call controller connected to the automatic response device receives the call and related call parameters from a telephone network and determines from the parameters if the call options is of the type to be handled automatically, and, if so, directs the call, along with call parameters, to the automatic response unit. The automatic response unit has access to a database containing data that specifies certain processing features, preselected by a subscriber, and based on the call parameters, that are used for the call processing.

BRIEF DESCRIPTION OF THE DRAWINGS

While the specification concludes with claims particularly pointing out and distinctly claiming the subject matter regarded as the invention, the invention will be better understood from the following description taken in connection with the accompanying drawings in which:

FIG. 8 is a flow chart illustrating the implementation of a language menu for presentation to a caller.

DESCRIPTION OF THE INVENTION

Figure 1:
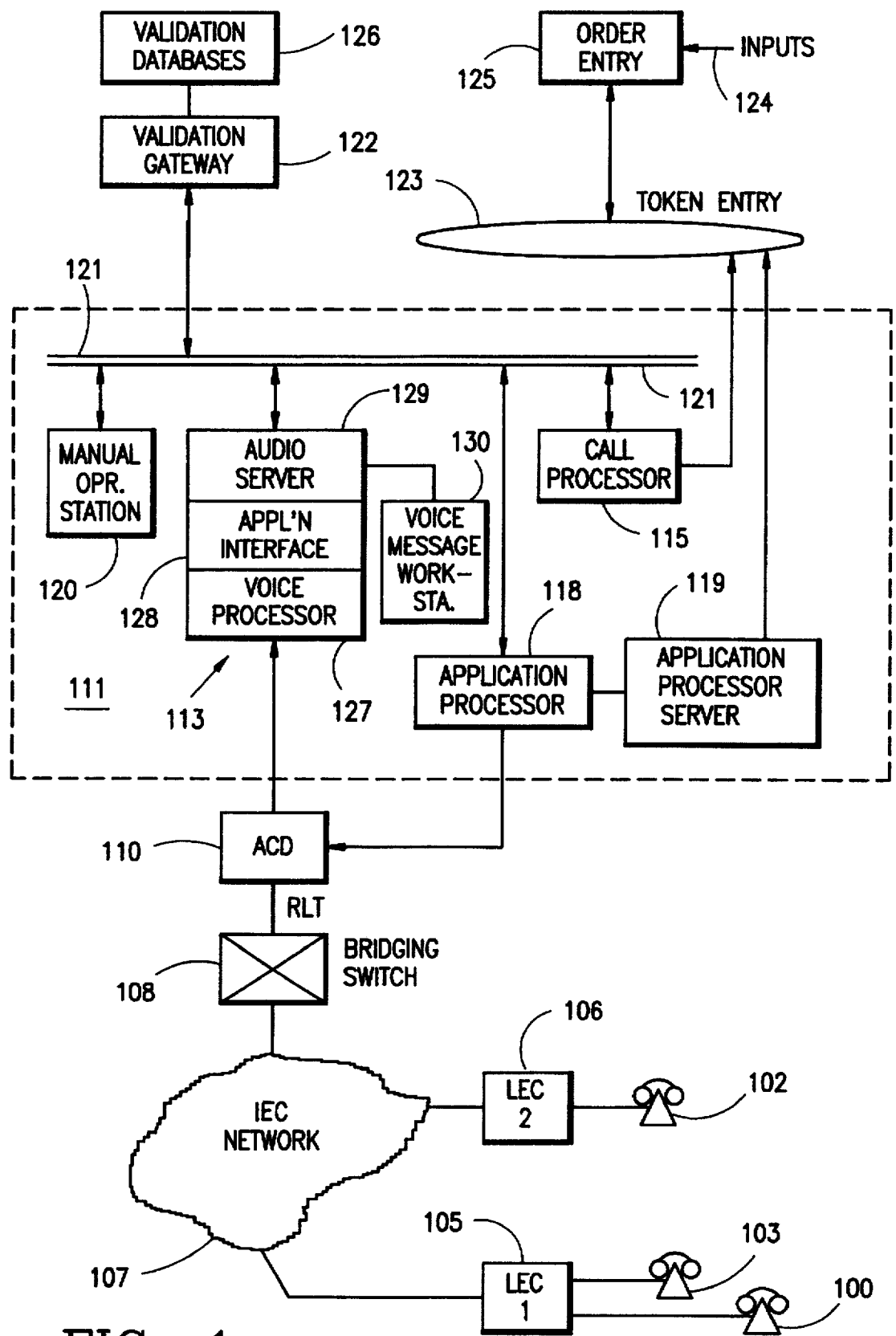
FIG. 1 is a block diagram of an automated system in accordance with the invention.

An understanding of the invention can be obtained by first considering the system of FIG. 1, along with a description of how certain calls which would ordinarily be handled by a human operator, are thereby processed. Included among such calls are those for which alternate billing arrangements are sought, including collect calls, those for billing to a third party, and those to be billed against a credit account. The flow charts of the remaining Figures will be discussed in detail subsequently, but may also be referred to in connection with FIG. 1 for a full understanding of the invention.

In FIG. 1 it may be assumed that a caller using telephone 100 desires to place a long distance telephone call to another party who is expected to answer at, say, telephone 102. The telephone 100 may be the one for which the caller is the subscriber (e.g., it may be the caller's home telephone), or it may be some other phone such as a coin-operated pay phone or a phone located in a hotel or at some other place of business. In any case, it will be assumed, for present purposes, that the caller desires to either bill the charges for the call to some account other than to the account for the originating station 100, or to otherwise obtain, for some purpose, what would ordinarily be referred to as operator assistance.

The caller may, for example, desire to have the call billed collect, for billing against the account of the called party telephone 102, or for third party billing against the account of the subscriber, say, for telephone 103.

Illustratively, the calling party phone 100 and the third party phone are shown connected to an interexchange carrier network 107 through a first local exchange 105 and the called party phone is shown connected through a second local exchange 106. Generally, these kinds of alternate billing calls have been placed by having the caller raise an operator on the line and then having the operator establish contact with a party at either the called station 102 or at the third party station 103 to obtain authorization, or approval, for the alternative billing to one or the other of these stations. If authorization for the charges is obtained, the operator then completes the call. The present invention carries out these and other operations without intervention by an operator and with customized processing features preselected by a subscriber.

By the invention, a caller at telephone 100, for example, can access the system for automated operator services in a number of ways. For example, the caller may dial 0+ (the digit "zero" plus other digits), 01 +, 0– (multiple "zeros"), a credit card number followed by a pause for a time out, or by an 800 special access number. The exact entry for access by the caller is relatively unimportant for present purposes. In any case, the local telephone exchange operating company, here LEC 105, which initially receives the call, recognizes the entry as a request for automated operator services by an interexchange carrier and passes the call through to the appropriate long distance network, such as to interexchange carrier 107. Within network 107 the call is ultimately routed, by means which are well known and which need not be discussed in detail here, to a bridging switch 108.

The bridging switch 108 is a standard item of telecommunications equipment which may be located wherever it is convenient; its purpose is to accept calls from the network 107, to bridge them to an automatic call distributor (ACD) 110, and ultimately into an automated operator center 111. The bridging switch 108 and the ACD 110, in one view, can be considered as part of the carrier network 107 and they will generally be interconnected to each other through a release line trunk (RLT). Notably, there may be a number of geographically dispersed automated operator centers, essentially identical to center 111, to efficiently handle calls from a wide geographic area, although for purposes of developing an understanding of the invention, it will be sufficient to focus here upon automated operator center 111. It may be helpful to also note, however, that the intelligence and capability for routing to one automated center or another, as appropriate, will be provided in network 107 by well known techniques.

The automated operator center 111 is comprised of audio response unit (ARU) 113, a call processor 115, an application processor 118, and an associated application processor server 119. For default operations it may also include a manual operator station 120. The audio response unit 113, call processor 115, the application processor 118, and the manual operator station 120 are connected together by way of a local area network (LAN) 121 to provide for communications between these system components. The local area network 121 may, for example, be an Ethernet LAN, which is a well known local area network system.

As a further part of the architectural framework shown in FIG. 1, the application processor server 119 is connected to a token ring network 123 which may offer connectivity beyond the automated operator center 111. In this case, there is an order entry system 125 beyond the center 111, also connected to the token ring 123, which accepts input data (as on line 124) related to, among other things, particular presubscribed customers for automated operator services and which allows data on customization features for those and other services to be down-loaded into the automated operator center 111. The down-loading is by way of the token ring 123, via one path to the server 119 for ultimate use by the application processor 118, and via a second path directly to the call processor 115.

Order entry systems, such as order entry system 125 are well known in the field of telephony and need not be discussed in detail here to develop an understanding of the present invention; it is sufficient to note that this system 125 generally is of the type which is available for serving a number of purposes for a public telephone network system, and that, for present purposes, it offers a window into the automated operator center 111 for entering and altering customization and other data to achieve custom features for automated operator services on a subscriber-by-subscriber basis and to set the functionality of the center 111 and its on-going operations. Its role in the invention's operation will become clear as further explanation of the invention progresses. The order entry system 125 may be located wherever convenient for serving one or various coordinated automated operator centers, and, for reliability, it may be redundantly available.

The technology for implementing the token ring 223 is also very well-known and readily available and therefore need not be elaborated upon. A token ring satisfactory for use in the invention, for example, may be obtained from Digital Equipment Corporation.

To complete the architectural framework of FIG. 1 there is a validation gateway 122 from the LAN 121 to access validation databases 126. As will become clear, the validation databases 126 are accessed during certain operations for confirming such things as credit card numbers presented for use by callers.

Operatively, the application processor 118, which is a general purpose computer, functions as the central point for call routing control at the automated operator center 111 and it exercises control over operation of the ACD 110. Within the application processor 118 there are data-tables (not specifically illustrated) to effect control of the ACD 110 and the delivery of calls within the automated center 111 generally to an appropriate port on the ARU 113 or, alternatively, to a live operator such as at operator station 120. Computers suitable for providing the functions of the application processor 118 and of its associated server 119 include the well known VAX model computers available from Digital Equipment Corporation. Similarly, the ACD 110 may be any one of a number of well known automatic call distributors or conventional switches adapted for purposes of the invention (one example of a suitable switch for this purpose is the Northern Telecom SL 100 switch). Here, the ACD 110 functions essentially as a queuing and selection switch. Those of skill in the art will recognize that it is entirely feasible, if queuing is not needed or desired, to provide a system essentially similar to that of FIG. 1 without using an ACD. Instead, in such event, the bridging switch 108 can be directed to route the call to the appropriate components or ports within the automated operator center 111.

As illustrated, when a call, such as a call for which alternative billing is sought, arrives at the ACD 110, the ACD makes a request to the application processor 118 for directions as to how the call should be treated. The routing of a call at the ACD 110 is controlled from the application processor 118 based on originating call information which comes in with the call. The application processor 118 receives this information, or parameters, (in the form of standard telephony messages) defining the call type, from the ACD 110 (which information, in turn was provided by the network 107 as is the usual case for call routing and processing) and performs a group select (e.g., for the ARU 113) using the received information and the internal data tables. The call parameters may include such information as the carrier identification code (CIC), called party number nature of address (NOA), automatic number identification of the calling party (ANI), pseudo country code (PCC), and language digit indicator (LD). In the case at hand, the application processor 118, based on the call type, including information indicating that the call is acceptable for automated processing, directs the ACD 110 route the call to ARU 113 which, in turn, queues the call as necessary, and makes a port selection on the ARU 113. Basically, the application processor 118 selects the ARU group operation from other operations available to be carried out. The call may be queued by the ACD 110 as necessary. It may be noted at this point that the call parameters may indicate that the call type is such that it is inappropriate to use automated services for handling the call (e.g., a subscriber may, by prior selection, indicate that its calls are not to be so handled). In those cases, the ACD 110 will be directed to route the call to the operator station 120 (or to another equivalent station) for handling by a human operator.

By operation of the application processor 118, call control is managed outside the ACD 110, allowing changes and updates to be more readily made. Call control is not driven by the ACD software, but by programming of the application processor 118. Given the criteria, the use of general purpose computers to control automatic call distributors in this manner will be recognized as an exercise that can be carried out by anyone of ordinary skill in the art.

Normally, although by no means exclusively, as will become clear, calls such as those under consideration here will be routed to an appropriate port (and queued as needed) of the audio response unit 113. The lines from the ACD 110 and into the ARU 113 are typical T1 voice lines as is well known in telephony. The ARU 113 may itself be obtained commercially, and for the present invention it has been determined that a voice response unit, based on an IBM System 95 PC, available from Intervoice, Inc. of Dallas, Tex. will perform satisfactorily. It may be noted, however, that the ARU is essentially in three operative components, illustrated in FIG. 1 as a voice processor 127, an application interface 128, and an audio server 129. The voice processor 127 is multi-port for voice communications via the T1 lines from the ACD 110 (e.g., one T1 channel per port to serve a number of calls simultaneously). The voice processor 127 includes subsystems, not specifically illustrated, for voice recognition and response in multiple languages; DTMF interaction capabilities to accept and respond to inputs from a telephone keypad, for example; and voice capabilities for implementing generic and customized scripts. The audio server 129 provides direction and control for the ARU 113, includes the customized and generic audio scripts, and interfaces with other system components. For a coordinated exchange of information and call processing directions, for example, the audio server 129 interacts, via LAN 121, with the call processor 115. The application interface 128 provides the interface between the voice response processor 127 and the server or control processor 129. Also connected to the audio server subsystem 129, for the creation and recording of audio scripts, is the voice message workstation 130 which includes microphones and recording devices (not separately shown in the drawing). Once such audio scripts are created they may be loaded into the audio server 129 to be called upon for use in processing a call.

Operatively, the ARU 113 provides the application processing to move through the automated steps, including the provision of such things as voice prompting and menu routing, as needed. The call flow processing includes the provision of such functions as playing out digitized voice messages and tones, decoding inputs from a telephone keypad (e.g., dual tone multifrequency, or DTMF tones), digitally recording voice inputs from callers, voice recognition, and monitoring call progress.

In a sense, the manual operator terminal 120 functions somewhat in parallel with the ARU 113. Certain calls, meeting certain criteria, will be directed to live operators, others will be intercepted from processing by the ARU 113, and diverted to the manual operator station 120. This will be more fully discussed hereinbelow. It is apparent that a number of manual operator stations can be operated simultaneously. An operator at a manual station, if needed, is presented (e.g., via a CRT screen) with information relating to any particular call. The flow control of manually handled calls matches the automated call processing in the ARU 113 so that a transfer from automatic to manual processing can be picked up at any time without loss of continuity in handling the call.

All of the call flow processing in the ARU 113 operates on a data driven basis. Decisions are made based on information and instructions available from the audio server 129, which, in turn, obtains information and instructions, at least in part, from the call processor 115 and, ultimately, from the order entry system 125. The call processor 115 may be an IBM RS6000 RISC (reduced instruction set) computer.

It is a feature of the invention that the automated services provided can be customized to meet the special needs of individual service subscribers. For example, a particular customer may wish to preselect the language used for the vocal interchange necessary for processing his call. Additionally, there may be a desire to use customized greetings or closings, or to have particular messages, or music played to callers during certain intervals or holding periods. This customization is effected by the entry of control data through the order entry system 125 from where it is downloaded to the call processor 115 and the application processor 118 through, in the latter case, the application server 119. The control data in the application processor 118 is available in conjunction with the received call parameters for each call to direct the call to the appropriate port or group of operations in ARU 113. The control data in the call processor 115 is available on a call-by-call, individualized basis for access by ARU 113 which implements the required, presubscribed customized features in accordance with the control data.

The actual scripts and so forth for customized applications may be created at the message work station 130 for loading into the ARU 113 and for being called to use as required.

Prior to describing the call flows in detail as set forth in FIGS. 2A-2C through FIG. 8, a call processing overview, as follows, may be helpful:

1) The switched network 107 determines that a call is to be routed to the automated operator center 111 and forwards the call to the appropriate ACD, here ACD 110.

2) The ACD 110 receives the call from a bridging switch (108) via a release line trunk (RLT) and delivers the call to a selected group, such as ARU 113 for automated processing using instructions from the application processor 118 and data which arrived with the call. The call data defines, among other things, the type of call that has been received. The ACD may queue the call until an ARU port is available.

3) Data collected from the call, such as ANI, called number, information digit, etc. are forwarded to the ARU 113.

4) The ARU then retrieves the "property record" (which is the record associated with the call data)/from the call processor 115. If no property record is found, a default record will be used for call processing.

5) Based on the data of the property record and the access method used, the caller will be prompted with appropriate, customized scripts and other features.

6) All calls and certain caller supplied information are validated (e.g., card numbers) against databases.

7) If a caller fails to respond within a certain time (usually upon detection of a time-out with silence), the call will be transferred back to the ACD 110 and routed to a manual operator.

8) Once an alternative billing method is validly implemented, the ARU will connect the calling and called parties and release the call back to the network 107. The ARU port is then available to accept another call.

Figure 2A:
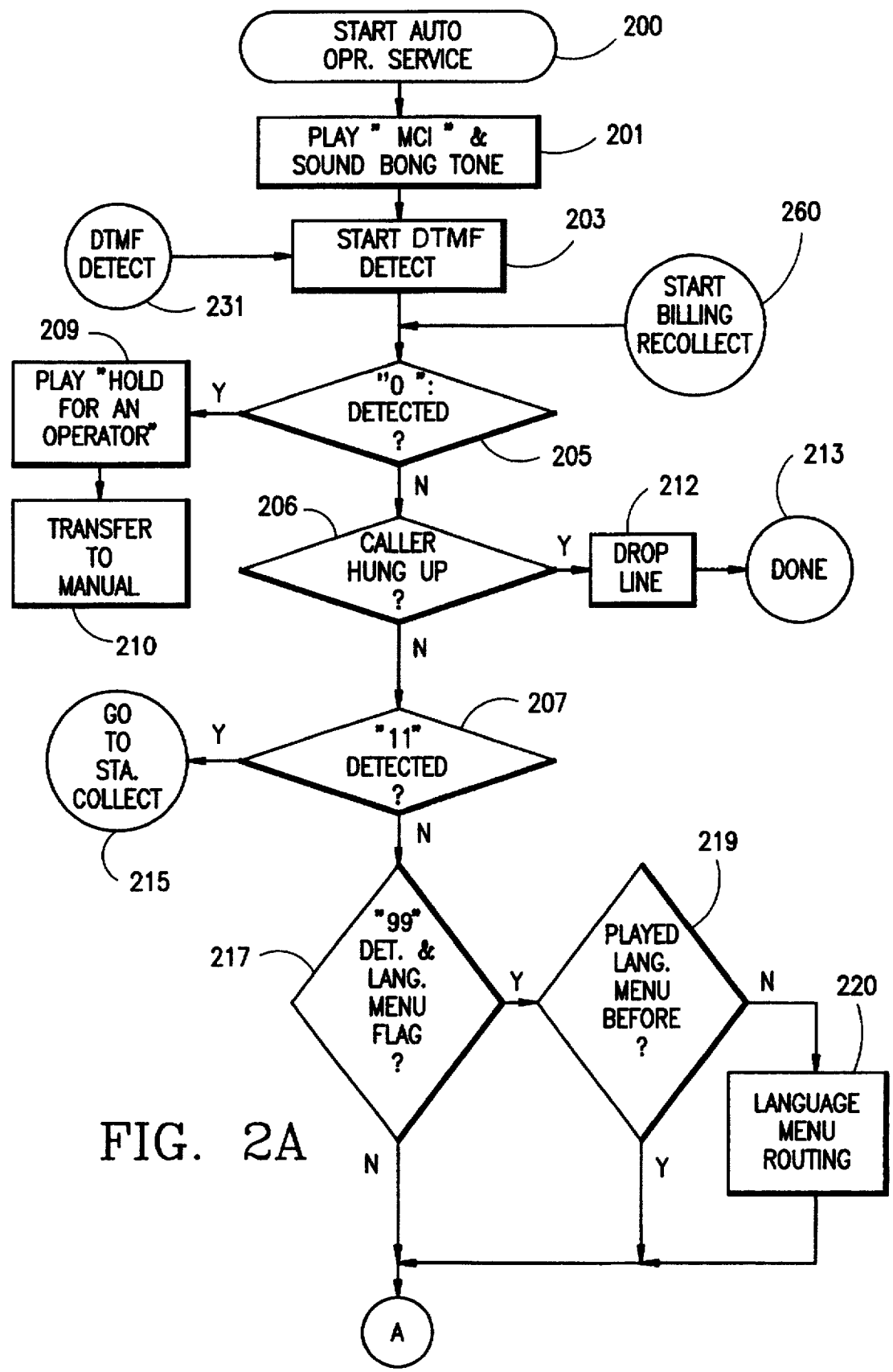
FIGS. 2A–2C, taken together, are a flow chart of certain principal operations of the invention, and as those operations might be carried out in a system according to FIG. 1.

Now with respect to the process flow charts of FIG. 2A et seq (and with reference to FIG. 1) it may be assumed that a call, as from telephone 100 of FIG. 1, for which automated operator services are sought, has arrived at the automated operator center 111. This may have occurred, for example, by the caller dialing "0" plus the usual ten-digit telephone number. Access and routing to that point has been attained as described above. Upon arrival, the ACD 110 is directed by the application processor 11, based on the call parameters that arrive with the call, to route the call to a particular group operation, in this case to the ARU 113. Also, using the call parameters, which are sent to the ARU 113 and the call processor 115 via the 121, the property record associated with the call is then retrieved and call processing is begun at step 200.

At step 201 an identification greeting is given along with an identifying tone—such as a typical bong tone. This may be from the long distance carrier or it may be a customized greeting called upon as a function of the call parameters and the property record. The customized greeting may be scripted to provide a customized greeting preselected by the subscriber and it may be in a particular preselected language. Generally, for convenience herein the invention will be described in terms of English language scripting and processing, although it is to be realized that it is a feature of the invention to provide for customized processing and scripting in accordance with the desires of individual subscribers. Furthermore, a certain amount of customization may be realized by a caller during a calling session.

At step 203 a capability to detect DTMF inputs from the caller's phone is set up. Then, in a succession of steps, the system determines at step 205 whether or not a "0" has been entered by the caller, at step 206 whether the caller has hung up, and at step 207 whether a particular code has been entered for requesting assistance for a collect call. The particular code here shown for requesting a collect call is "11", although any other code can obviously be selected for use. Instructions to let the caller know which inputs are required for a particular function are included in the process as will become apparent with further explanation.

If, at step 205, a "0" is detected, this is an indication of a request for live operator assistance and step 209 is entered whereby a message is caused to be played to inform the caller to hold for an operator. Step 210 then follows to effect the transfer of processing from the ARU to a manual operator terminal (as station 120 in FIG. 1). Step 205, located at this point of the process, facilitates the ability to raise a manual operator at any time if desired.

At step 206, if it is determined that the caller has hung up, then step 212 is entered, dropping the call and discontinuing call processing for that call at step 213.

If, at step 207, it is determined that the caller wishes to make a collect call, then the process diverts, through step 215, to a subprocess for implementing collect calls. That subprocess will be more fully discussed below in connection with FIGS. 3A–3C.

On the other hand, if there is no indication in step 207 that the caller wants to make a collect call then, in step 217 a determination is made as to whether or not the caller has entered "99" which is the code (for example) entered by a caller to cause a language menu to be presented in return.

Figure 2B:
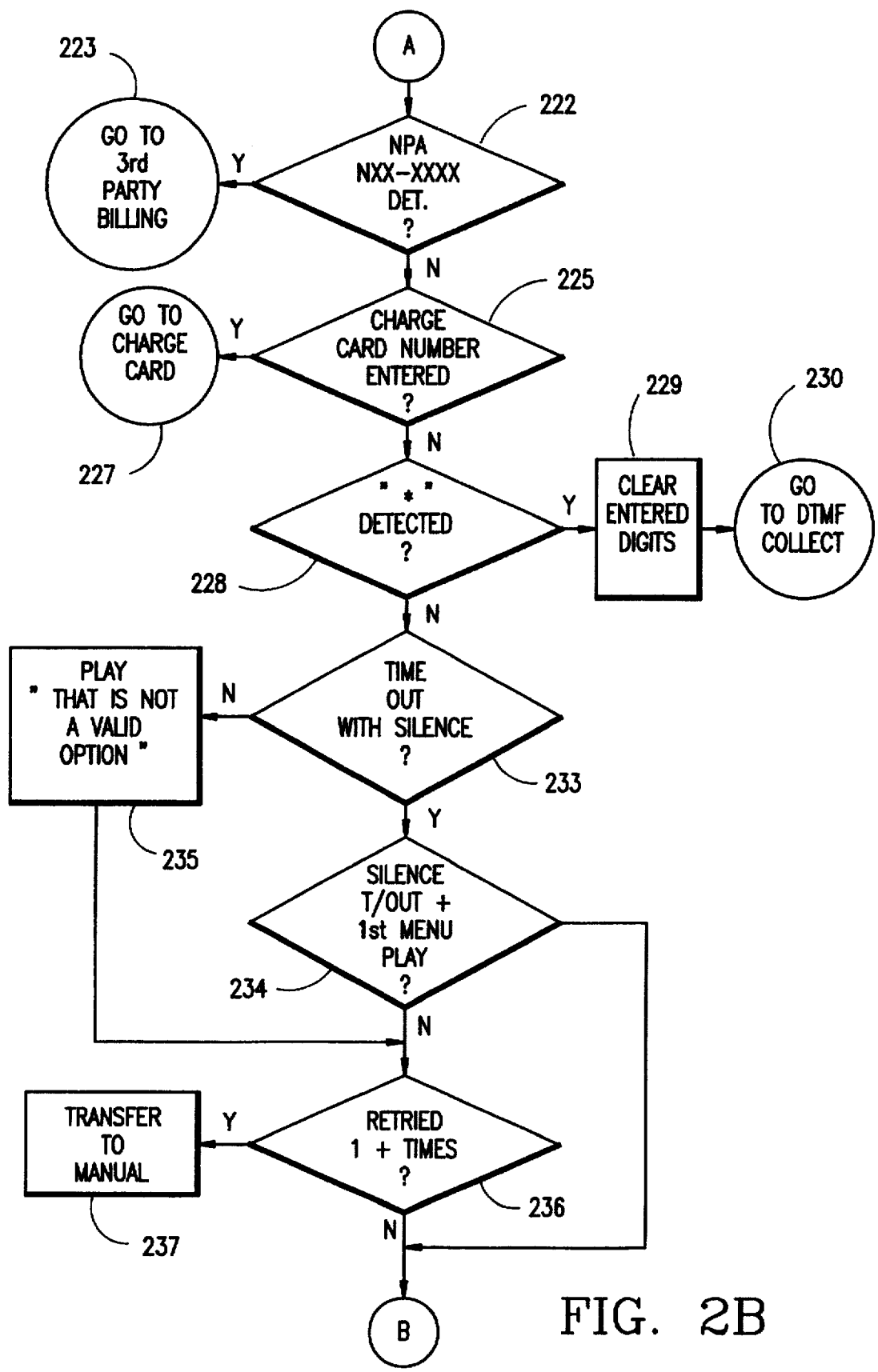
Figure 2C:
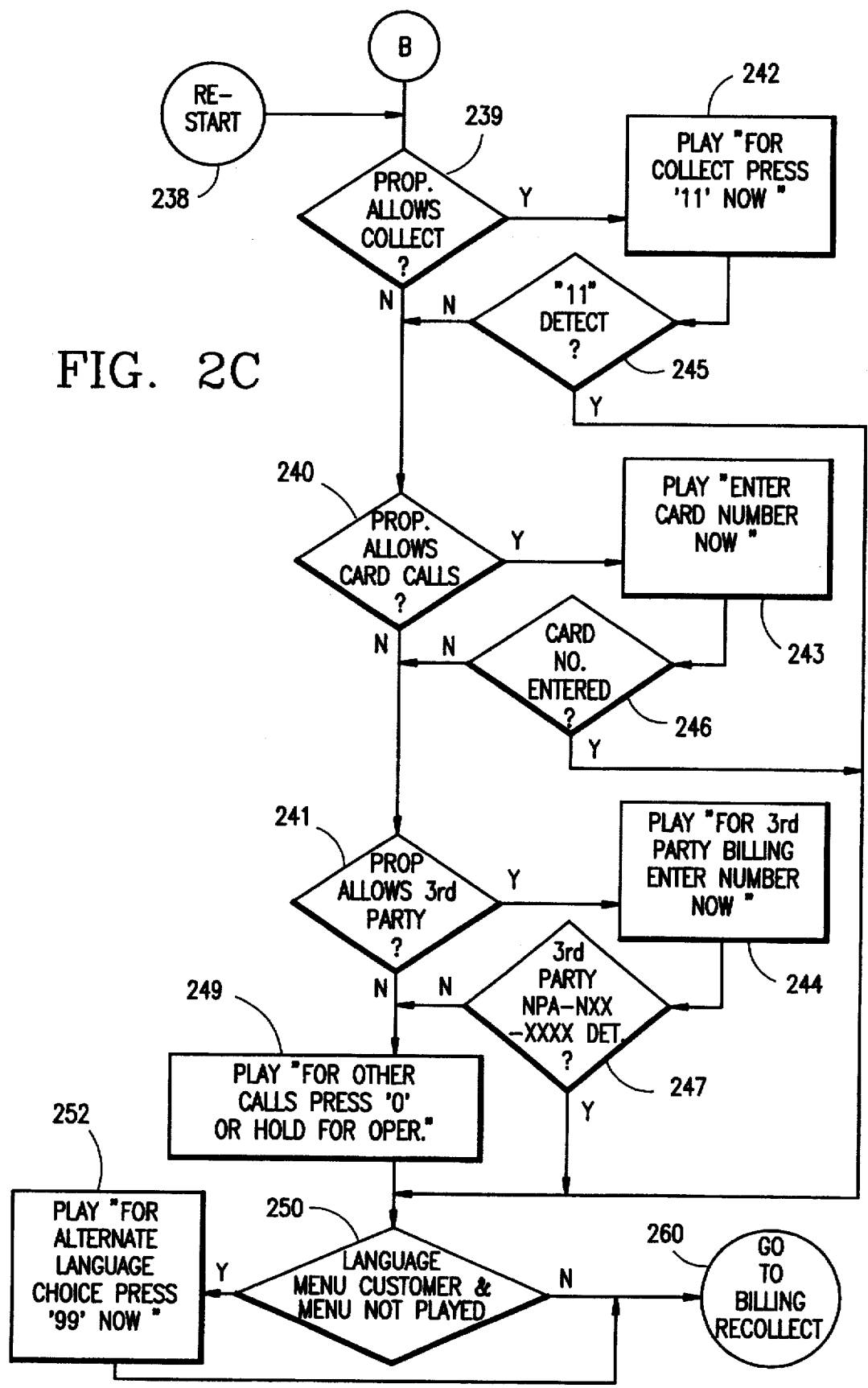

The input code, "99", is accepted to cause a language menu to be played, however, only if a language menu flag has been set, indicating that the language selection feature has been presubscribed for. If both the language menu is requested and the language menu flag is set for the particular property record, then a query is made at decision point 219 as to whether the language menu has been played before for this call. If not, then the language menu routine 220 is entered causing the menu to be played to the caller. The details of routine 220 will be presented subsequently herein. If the language menu has been played before, however, the language menu routine 220 is not again called on and the process continues to step 222 (FIG. 2B).

Whether or not a third party billing number has been entered by the caller (e.g., in the standard form of NPA-NXX-XXXX) is determined at step 222. If a number has been entered, then the process diverts to the third party billing process at step 223, which will be covered later herein in connection with FIGS. 5A–5C.

Figure 7A:
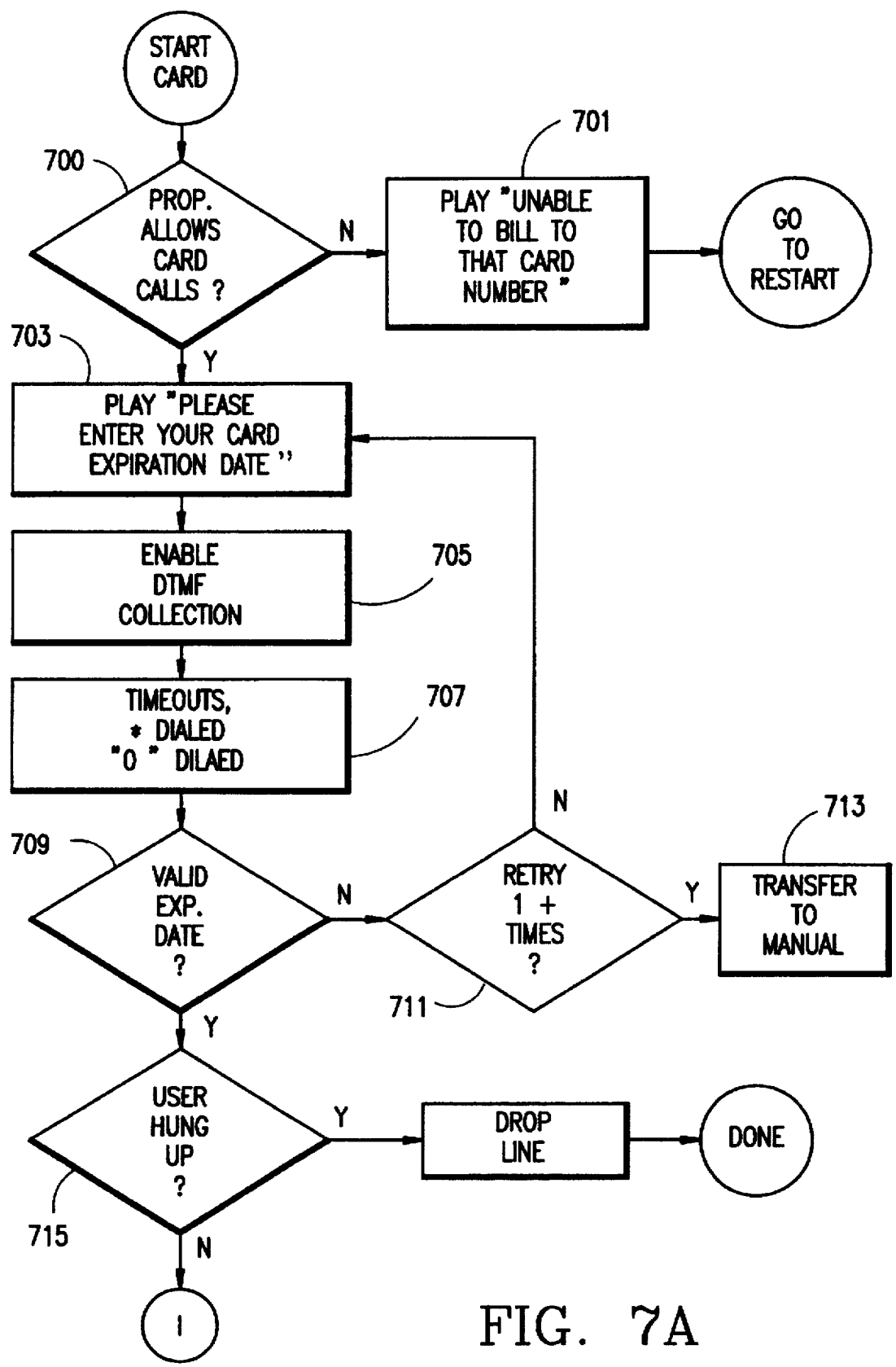
FIGS. 7A–7B, taken together, are a flow chart of operations for alternatively billing a call to a credit card number (which may be a commercial card, a card issued by a regional phone company, or any of various others)
Figure 7B:
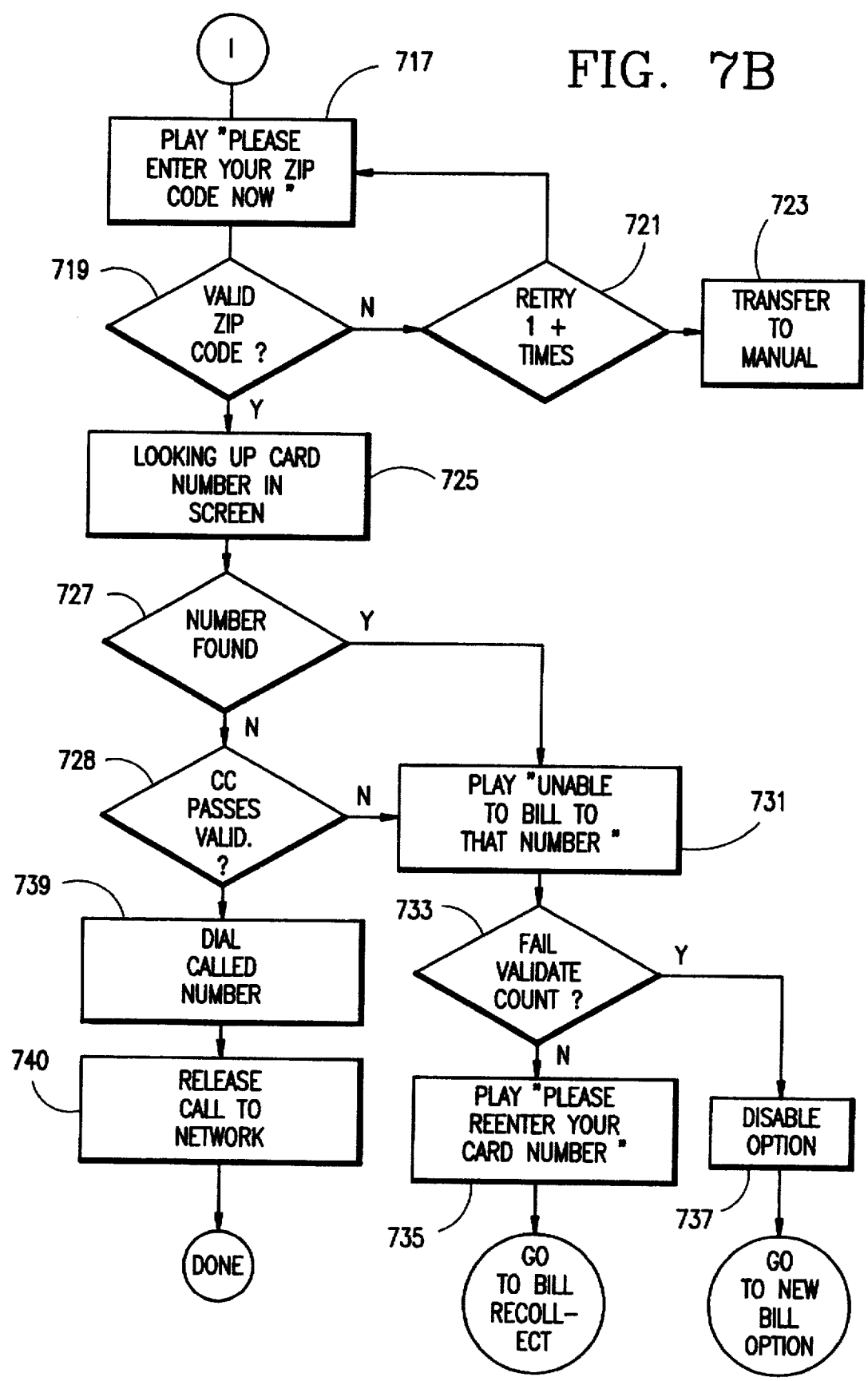

If no third party billing number is detected at step 222, the next step 225 is to check to see if a charge card number has been entered from the caller's telephone. If so, then a diversion is made via exit route 227 and the routine for processing the call for billing against a charge card is entered. This routine is discussed in connection with FIGS. 7A–7B, below.

Next in the process are steps 228, 229, and 230 to allow digits previously entered by a caller to be cleared and to cause a restart of the process. This might be desired, for example, in case a caller has made a mistaken entry and wishes to begin anew. The caller can command digit clearance by depressing the star key (*), for example, on the telephone keypad. Thus, at step 228, if a star key entry is detected this is taken as a request to restart the process for some reason and step 229 is picked up to cause clearance of all previously entered digits for the call. The process then returns, through exit point 230, to entry point 231 (FIG. 2A) where the process begins again with DTMF detection for collection of new entries by the caller.

If no star entry is detected at step 228, the system checks, at step 233, to see if some preset time period has elapsed without activity (e.g., if there has been a time-out with silence). If there has been, the program advances to step 234 to determine if a menu of options to be presented to,the caller has previously been played (or routed through). If step 233 determines that some input, vocal or otherwise, has occurred before the timeout, it is then presumed, since the input has been unrecognizable, that the input was invalid. Accordingly, the program moves to step 235 thereby it is announced to the caller that the input received was not a valid option. From there, processing is returned to the main process flow subsequent to step 234, with the presumption that the options menu has previously been routed through.

If step 234 determines that the menu of services has been offered or checked previously, a test is next made at step 236 to determine if the menu has been offered a number of times exceeding some preselected threshold. The threshold number may be set as desired, but typically may be set to present the caller with up to three replays of, or routings through, the menu. If the threshold is exceeded the caller is transferred to a live operator via exit point 237.

If the menu selection steps have not been previously routed through (step 234) and the threshold has not been exceeded (step 236), automated processing continues (FIG. 2C) and a series of steps 239–247 are set up for routing through the menu of options. The menu routing depends on which service the caller wants to use and on what the property record allows. In step 239 a test is made to determine if the subscriber (the property record) allows collect calls to be made; in step 240 the property record is tested to see if credit card calls are allowed; and in step 241 a test is made to determine if third party billing is allowed. If the property record indicates permission, then the caller is directed to enter "11" for a collect call (step 242), the card number for a credit card call (step 243), and the third party number for a third party billing call (step 244), respectively. Entry of any appropriate response avoids the need to play other options from the menu. That is, upon detection of either "11", a credit card number, or of a telephone number for third party billing, process steps 245, 246, and 247, respectively, cause the process to advance to step 250, skipping any intervening steps or menu options.

In the event, however, that the property record does not allow any caller options (neither collect, credit card, or third party billing) or if the caller makes no selection from the menu, step 249 is implemented, and the caller is directed to either enter "0" or hold for a live operator. From that, step 250 is also entered.

In step 250, a test is made to determine whether the subscriber is a language menu customer and if the language menu has yet been played. If the property record shows that the caller is entitled to alternate language processing as an attribute of the call processing, and if the menu for that has not yet been played, step 252 directs the caller to enter "99" to invoke that menu. Once that message has been played or if the menu has already been played for an entitled caller, the process enters the billing recollection entry point 260, shown on FIG. 2A, returning processing to steps 205 et seq., discussed above, for processing in accordance with the caller response. That is, depending on the caller response and the property record, one of the subprocesses will be entered.

Figure 3A:
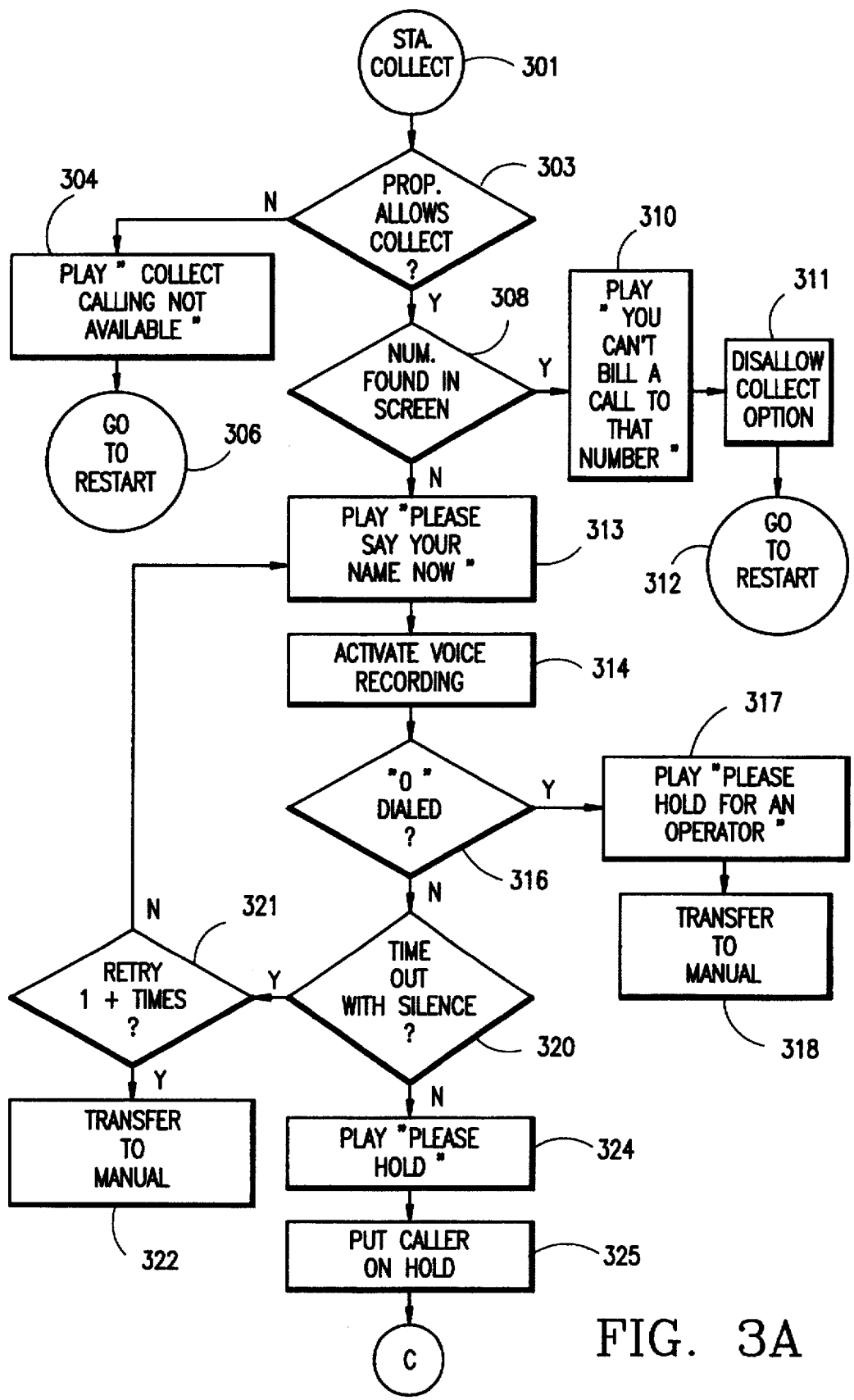
FIGS. 3A–3C, taken together, are a flow chart for collect call operations.
Figure 3B:
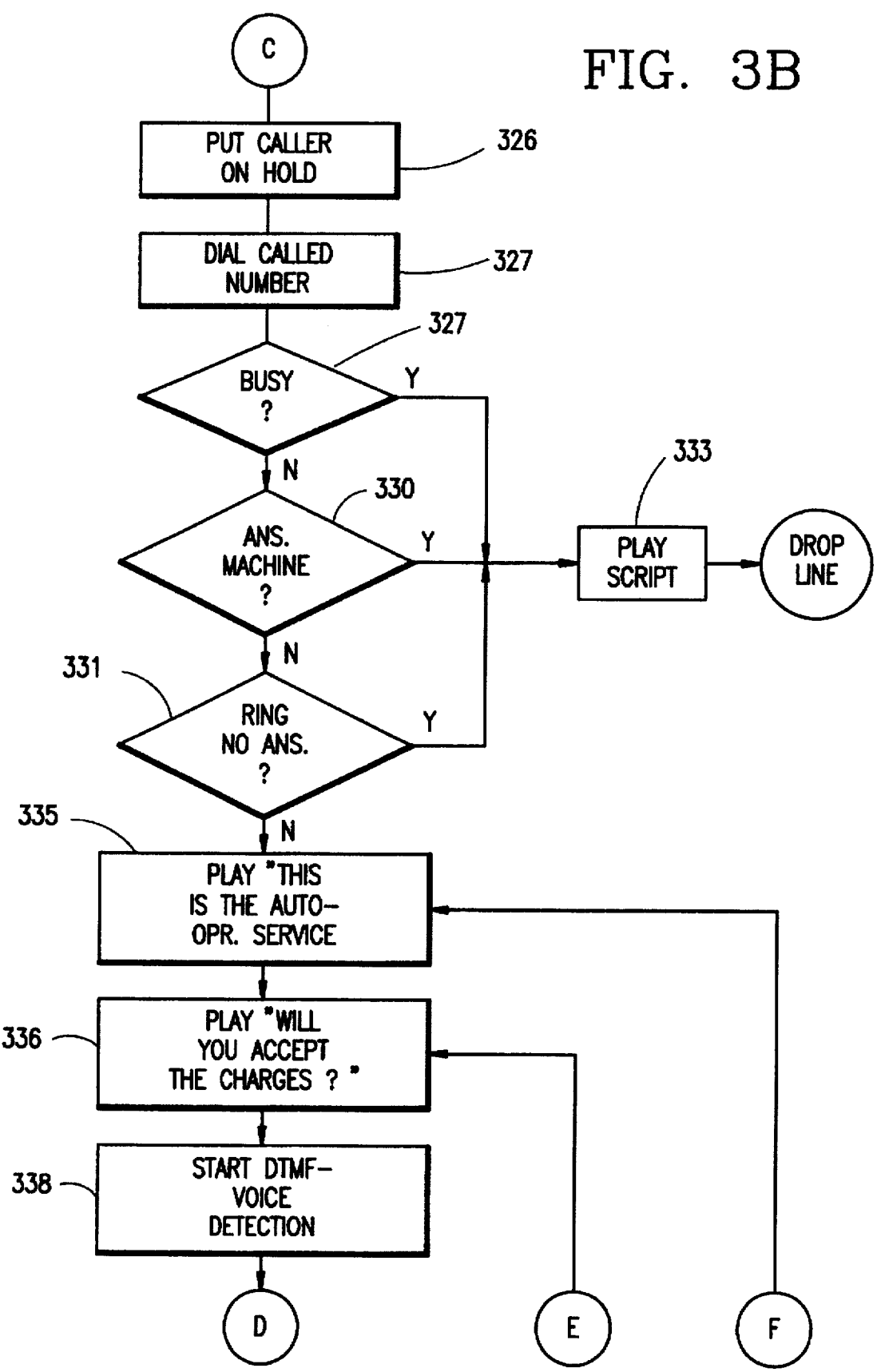
Figure 3C:
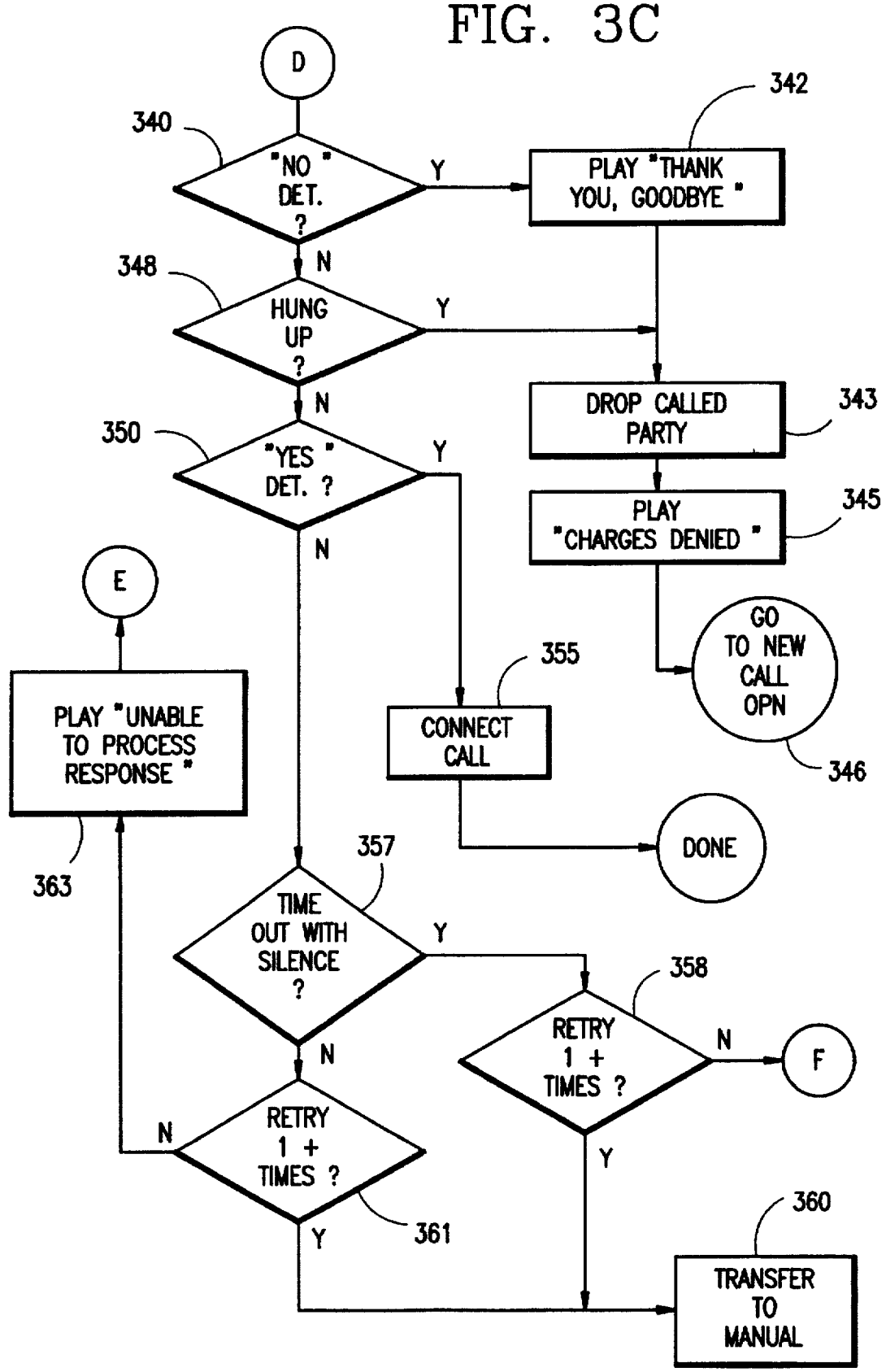

FIGS. 3A–3C depict the process for a collect call handled in accordance with the invention. For illustrating the handling of collect calls, the caller may be assumed to have entered "0" plus the number sought to be billed against. In FIG. 3A the process picks up at point 301 from the entry point 215 of FIG. 2A (the caller having entered "11" to select collect call processing), retesting first at step 303 to determine if the property record allows collect calls. If not, a script at 304 advises the caller that "collect calling is not available" and the process returns to "Restart" via point 306, ultimately thus restarting processing at point 238 (shown on FIG. 2C). If, however, the property allows collect calls, then at step 308 the number sought to be billed against is screened to see if calls can be billed against it. The billing number screening is done by access to validation database 126 via the validation gateway 122, as illustrated in FIG. 1.

The billing number screening is generally against a negative database so that action is taken to discontinue collect call processing only if the number is found in the data base. Thus, in step 308 if the number is found, a script is played at step 310 advising that a call cannot be billed against the entered number, the collect call option is denied at step 311, and the processing is returned to the Restart point via connecting point 312. It may be noted at this point that it is a feature of the invention to provide a recycle of the process in this manner to allow a caller to make successive attempts to place a call without dropping them from the system.

If the number is not found, however, at step 313 a script is automatically played, directing the caller to speak his name. That is recorded at step 314 for later playback.

At any time, the caller may enter a "0" to gain access to a live operator. At steps 316 if a "0" is detected, a script is played at 317 advising to "hold for an operator", and transfer is made accordingly at step 318.

If the caller fails to respond within a certain time, resulting in a silent line for that period, as determined at process step 320, then step 321 is entered which performs a test to determine if the caller has been prompted for his name excessively. This test is essentially a counter with a threshold, which, if exceeded causes a transfer of the call to manual, bringing an operator on the line (as via station 120 of FIG. 1) at step 322.

If there is no time-out with silence, then a script is played at step 324 advising the caller to "please hold." The caller is placed on hold at step 325, and may, as a customized feature, be provided with subscriber preselected messages or music while holding. While the caller is on hold at step 326, the system automatically dials the called number at 327. Next a series of tests are made at steps 329, 330, and 331 to determine the response to the call; i.e., whether the line is busy, an answering machine has responded, or there is a busy-no answer response, respectively. Any one of these responses causes a script to be played at step 333 advising the caller of the response. Since the call cannot be completed, the caller line is then dropped. The detection of these responses is by standard techniques available for such purposes.

If, however, the responses to these tests are all negative, a script is played to the called party at step 335 advising, for example, that "This is the MCI automated operator—I have a collect call from [caller's recorded name]." (This message may be in another, preselected language besides English, of course.) Following that, a script is played (step 336) asking "Will you accept the charges?" For detecting the called party's responses, a DTMF detector and/or a voice recognition device are activated at step 338. The called party may be instructed to enter particular DTMF digits as "yes/no" indicators, or the voice recognition system may simply recognize the spoken words. If a "No" indication is received at step 340, then the process is caused, at step 342, to play an appropriate script to the called party and then to drop the called party line at step 343. Since, in this leg of processing, the charges will not be accepted, a script is played to the caller at step 345 advising that such is the case, and processing moves through exit point 346 to a subprocess (depicted in FIG. 4) for the caller to request new call options.

If, at step 340, there is no detection of a "No" response, then step 348 determines whether the answering party has hung up or not. If so, then the collect call cannot be completed and step 343 is entered and processing proceeds through exit point 346 as discussed above to allow the caller other options. If the answering party neither gives a "No" response nor hangs up, however, and if a "yes" response is detected at step 350, indicating that charges will be accepted, then step 355 will be implemented to connect the call. Processing is then complete for that call. It will be recognized that connecting the call releases it back into the network 107 (FIG. 1) through the release line trunk, etc.

If a "Yes" response is not detected at step 350, the system checks for a "time-out with silence" at step 357. If there is a time out, then limit detection is employed, step 358, to determine if the called party has been prompted for response a number of times in excess of a preset threshold (e.g., twice). If not, return is made to step 335 and the script introducing the automated operator to the called party is replayed. If the threshold is exceeded then transfer is made to a live operator at step 360.

With no "time-out with silence" detected at step 357, excessive prompting is also determined at step 361. Again, if a threshold is exceeded, the call is referred to a live operator for handling via step 360. If not excessive, but since an appropriate response has not been received from the called party, step 363, by script, informs the caller that the system is "Unable to process your response." Processing is then returned to step 336 to ask the called party again if the charges for the call will be accepted. Thus, the process will continue until the call is denied, accepted, diverted to a live operator, or the caller is allowed a new calling option.

Figure 4:
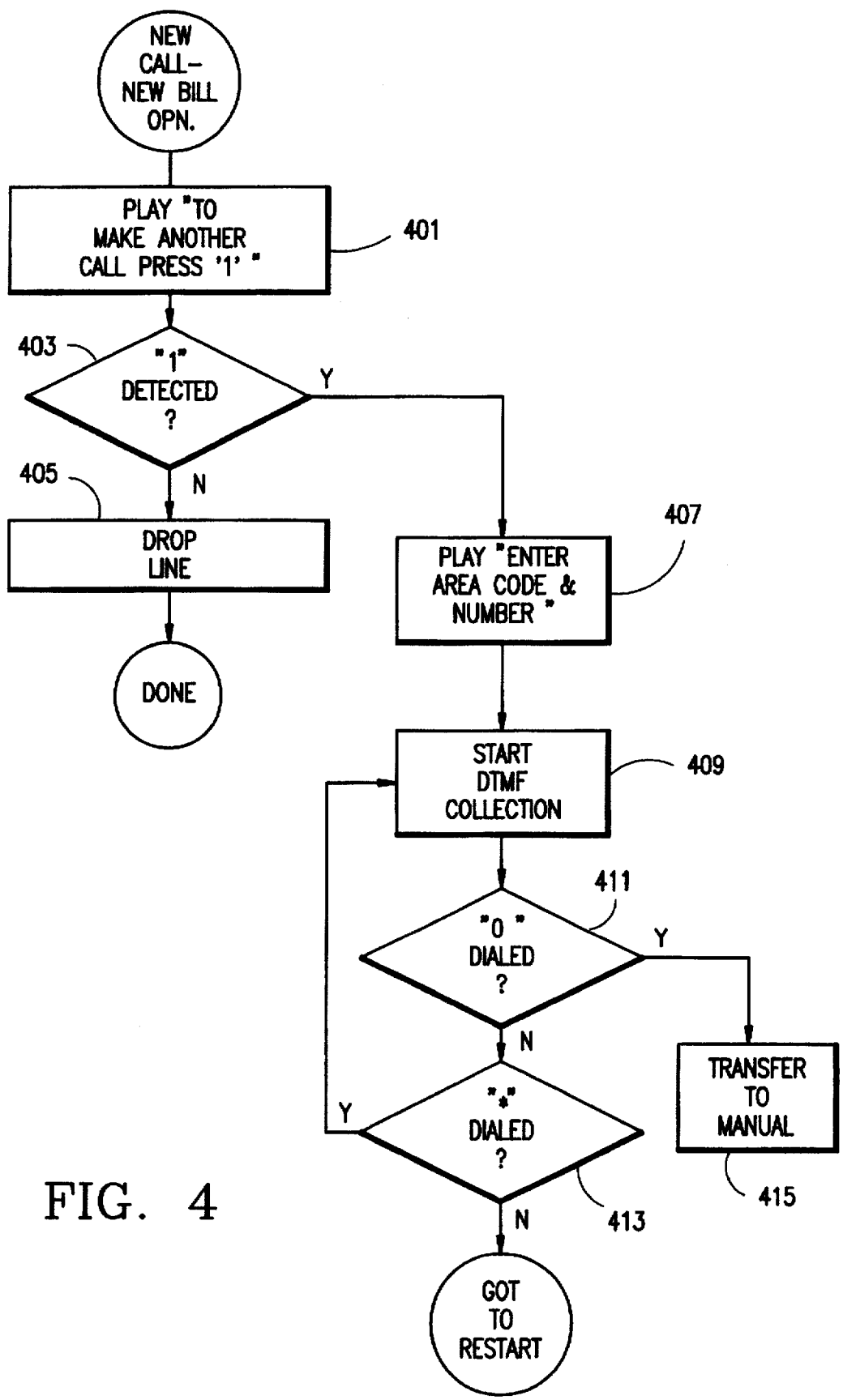
FIG. 4 illustrates, in flow chart form, operations for new call/new billing options available as part of the invention.

In FIG. 4, the new call/new billing option begins with step 401, entered from exit point 346 of FIG. 3C, advising the caller, by script, to enter "1" to make another call. Obviously, another appropriate input can be used if desired. Next, at step 403, if a "1" is not detected, step 405 operates to drop the call and the process is done for that call. On the other hand, if a "1" is detected, the caller is directed at step 407 to enter the telephone number to be called. The process starts DTMF detection at step 409, followed by steps 411 and 413 to check to see if a "0" has been entered for live operator assistance or if a request has been made to clear the digits entered (e.g., by the "*" key), respectively. A switch to manual processing is available via step 415. Digit clearing results in a recycle of the process from step 413 back to the start of DTMF collection 409. If neither live operator assistance nor digit clearing is requested, the call is advanced to the "Restart" entry point of FIG. 2C so that the caller can then be offered the available automated operator services.

Figure 5A:
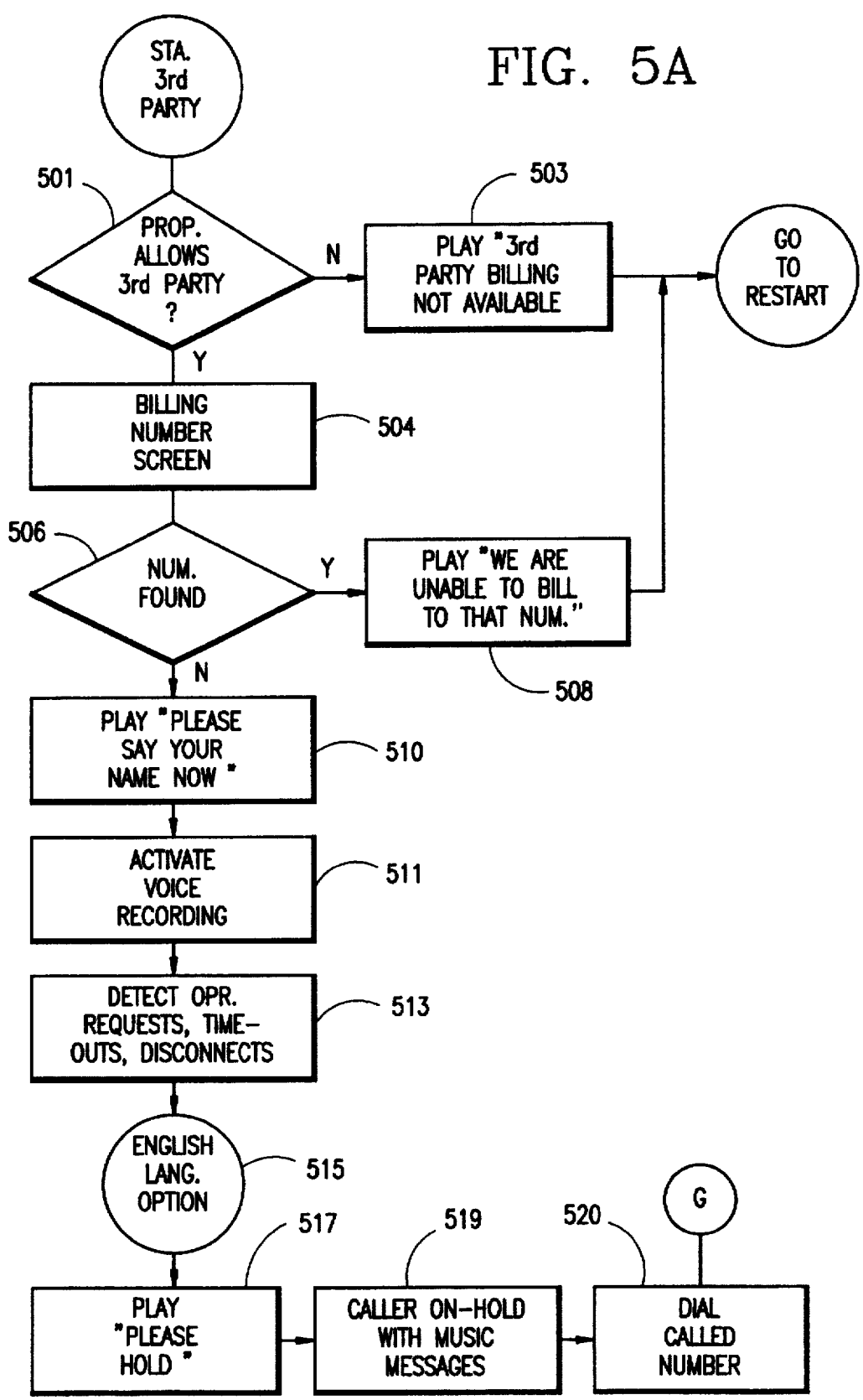
FIGS. 5A–5C, taken together, are a flow chart for billing calls alternatively to a third party.
Figure 5B:
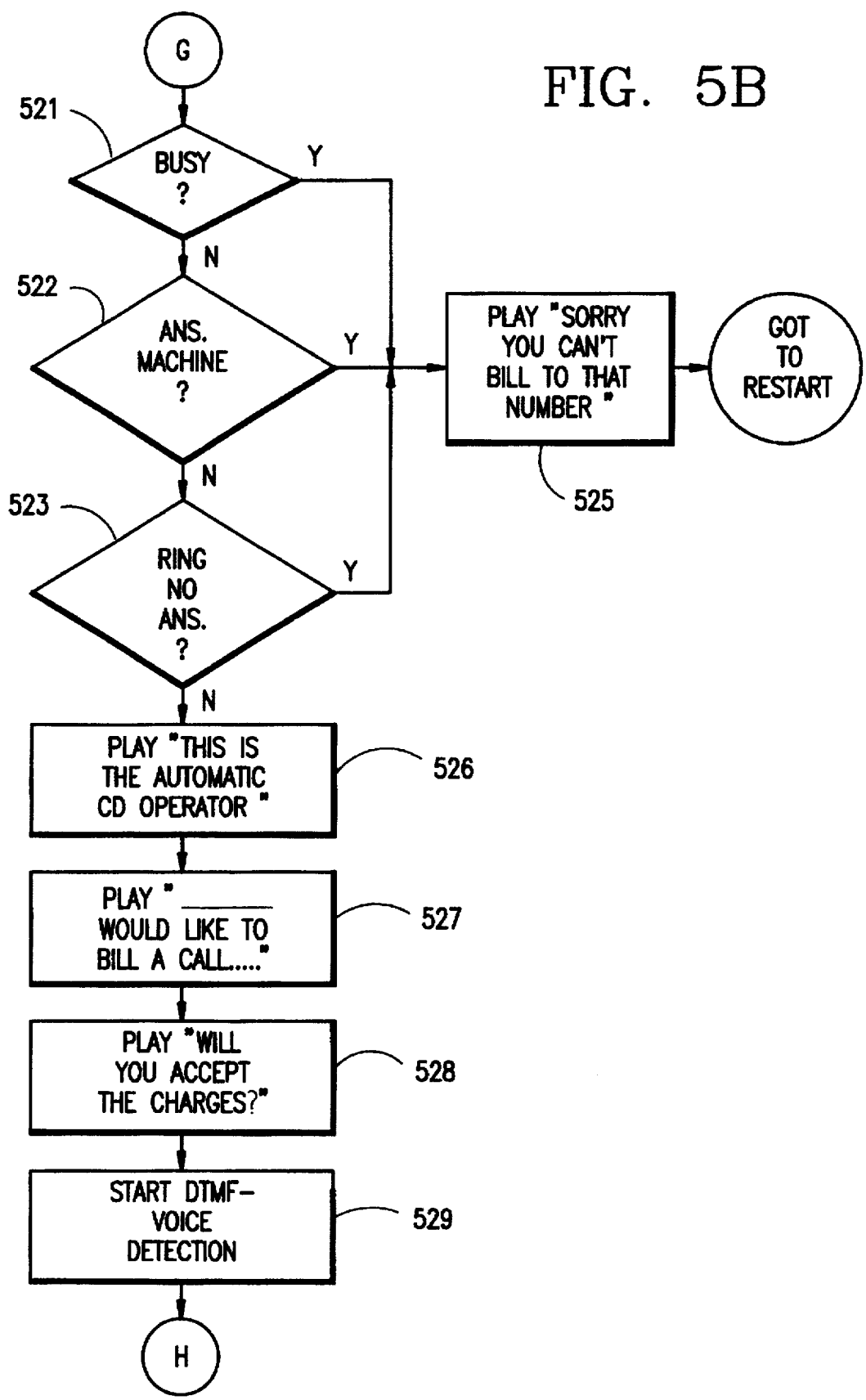
Figure 5C:
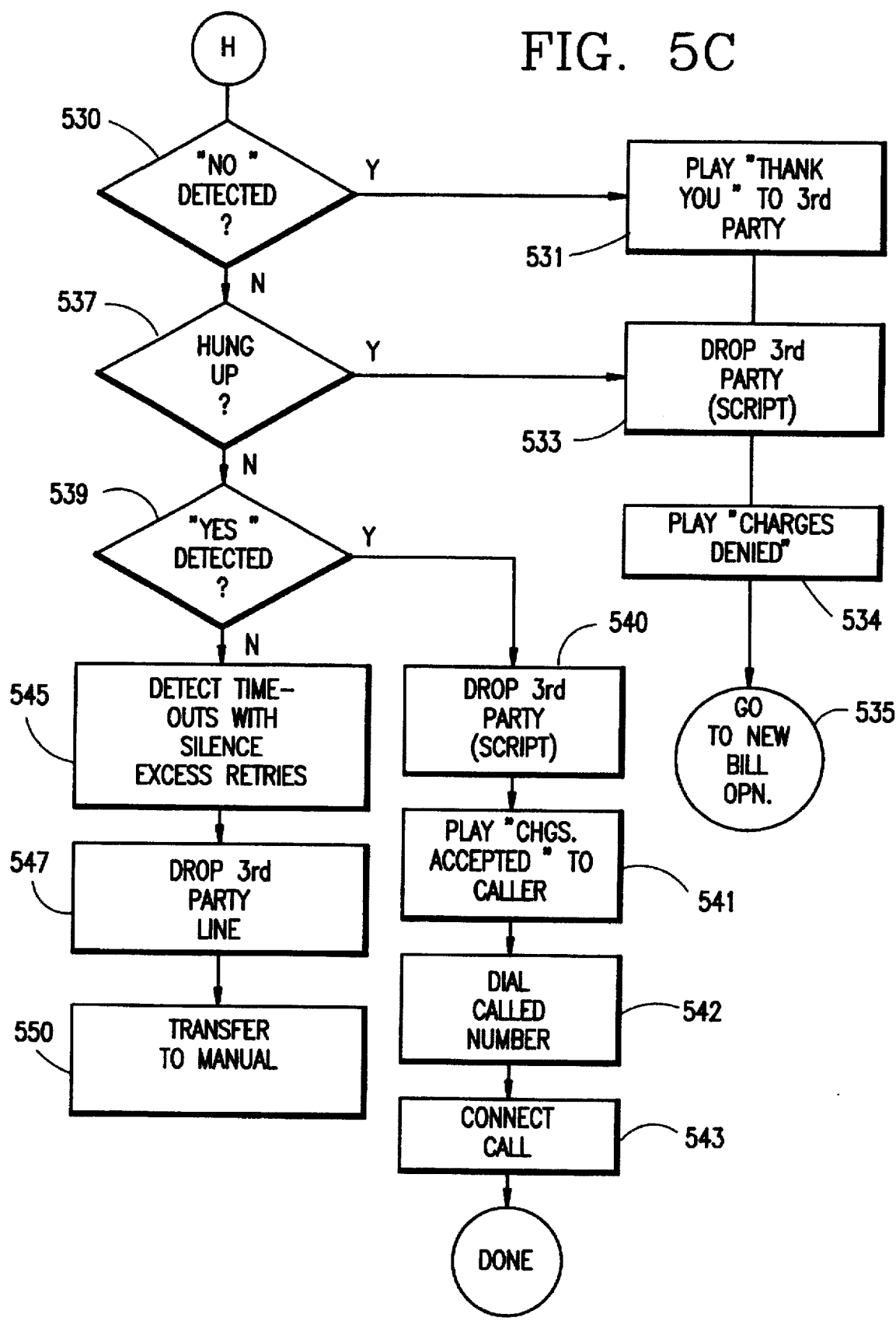

Referring to FIGS. 5A–5C, illustrating processing for billing calls to a third party, the initial step 501, in FIG. 5A, is to make a determination, from the property record, as to whether third party billing is allowed. If not, a script is played, step 503, to advise the caller that such billing is not available for the call. The process then returns to the Restart entry point 238, shown in FIG. 2C, to allow the caller to select other processing options that might be available.

If the property record shows that third party billing is allowed, a billing number screen is conducted at step 504 to see if the billing number, per se, is unavailable for such billing. Billing number screening was discussed above in connection with collect call processing and is essentially the same for third party billing. If the number is found in the negative screen by step 506, then a call cannot be billed to that number and an announcement is given to the caller, per step 508, indicating that the number cannot be billed against. Also, in that case processing is returned to the Restart entry point to allow other processing options.

When the number is not found in the screen, a script will be played at 510, directing the caller to speak his or her name. Voice recording capability is activated (step 511) to capture the caller's response. Since the caller's response may be unpredictable, at this point the system checks, at step 513, for operator requests ("0" detect), caller disconnects, and time-outs with silence. These responses are handled essentially as was discussed above in connection with the collect call process, and for conciseness that discussion is not repeated here nor are the specific details shown again in FIGS. 5A–5C.

It will be recognized that the caller and the system may be interacting in a language other than English. It may be desirable, however, to have the system make contact and interact with the third party in English. If that is the case, a step can be added to the process, as step 515, whereby the caller may request that interactions with the third party be conducted in English. This can be done, for example, by having the system ask the caller if he or she wishes to have it prompt the third party in English. The caller can then signify, by voice or telephone keypad, one way or the other. For example, the caller may be asked to press "1" on the keypad to cause interaction with the third party to be conducted in English. It will be recognized, of course, that logic may also be included to skip this step if the caller interaction is already in English. And certainly it is within the scope of the invention to select other languages which are different for interaction with the caller and the third party. It will also be recognized that this language changing feature may be used in the collect call processing discussed above.

At step 517 the caller is asked to "Please hold" and is placed on hold while the system begins to make contact with the third party. At step 519, as a subscriber option, the caller may be connected in to hear preselected music or customized messages while on hold. This is a feature available for any of the call processing described herein (e.g., for collect calls) whereby during interludes or holding periods in the call flow, customized music or messages are made available to the party on-hold.

The third party number which has been entered by the caller is dialed by the system at step 520. Then the system runs through routines, at steps 522–523, like those discussed above for collect calling, to determine the response at the third party phone; i.e., whether busy, answer machine response, or ring-no-answer. If the response is any of these, then the caller is informed, by step 525, that the call cannot be billed to the third party number. The process then returns to the Restart point.

If there is an answering party, however, announcements are made introducing the automated operator, letting the third party know that a caller (whose recorded name will be given) wishes to bill a call to the third party number, and asking if the charges will be accepted (steps 526–528, respectively). DTMF and/or voice recognition detection capabilities are activated at step 529 to accept the third party's inputs. As discussed above, these inputs can be in the form of telephone keypad inputs or "yes/no" vocal responses. Detection of a "No" response, step 530, causes a "Thank you" response (step 531) to be given to the third party and to drop the third party line (step 533). An announcement is then made to the caller, at step 534, that the charges will not be accepted and the process moves, via exit point 535, to present the caller with new billing options (discussed below).

If "No" is not detected at decision point 530 or a determination is 537 is made that the third party has hung up, then steps 533–535 are also used to move to new billing options for the caller.

A "Yes" response is looked for, at step 539, if the third party neither said "No" to the request nor hung up. If "Yes" is detected, the third party line is dropped, the caller is informed that the charges will be accepted, the called number is dialed by the system, and the call is released back to the network for completion (steps 540–543, respectively). On the other hand, if A "Yes" is not detected, the system, by a combination of actions at step 545, looks for time-outs with silence and excessive retries (as was discussed above for collect calling) and recycles either to an introduction of the automated operator at step 524 or to step 528 to ask again if the charges will be accepted (the recycle paths are not shown specifically in FIG. 5C).

Ultimately, if a "Yes" response is not detected at step 539, and following a reasonable number of requests for response from the third party, the third party line is dropped at 547 and the caller is transferred to a live operator at step 550.

Figure 6:
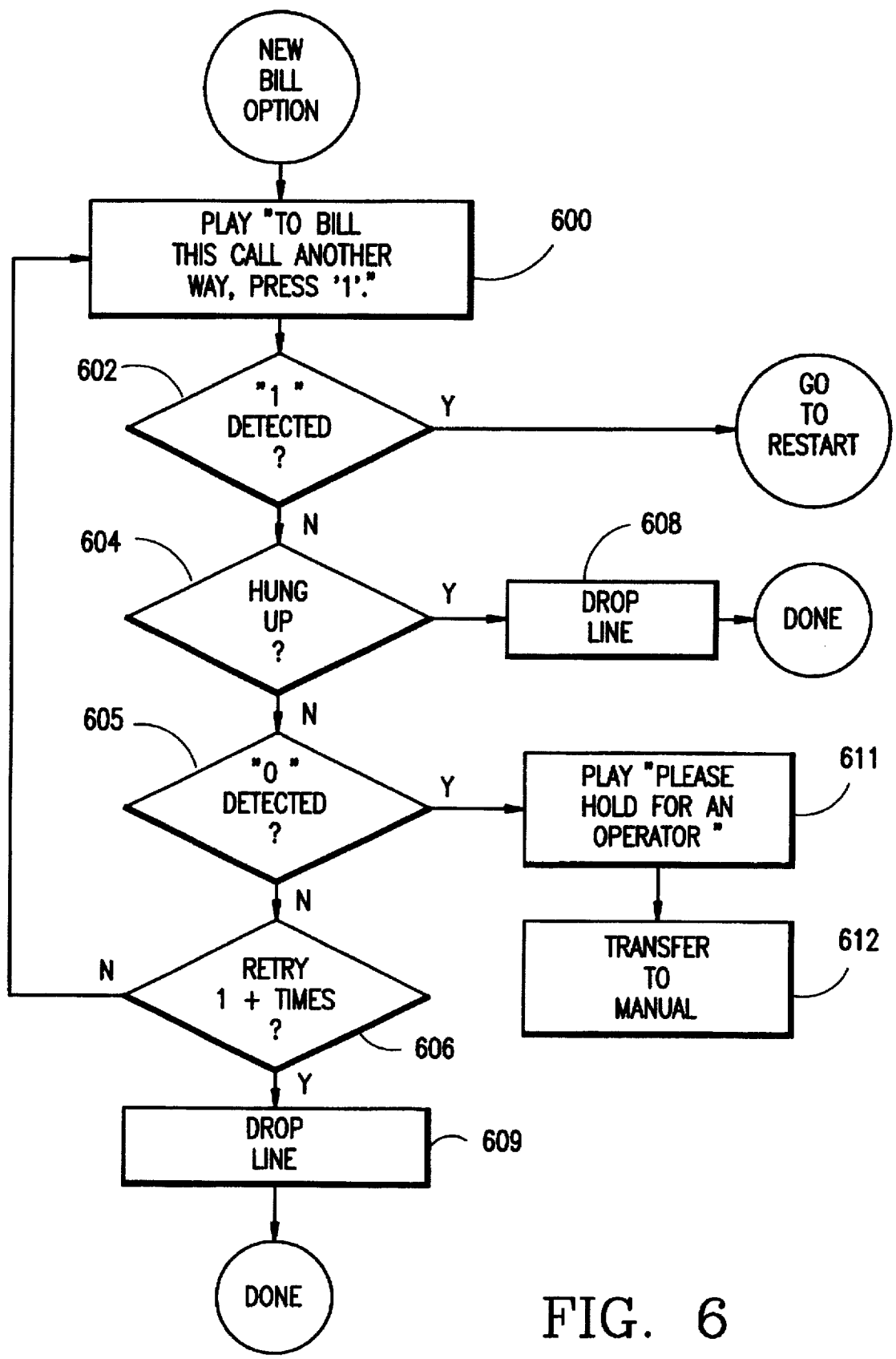
FIG. 6 is a flow chart of operations for a new billing option.

In the event the third party billing is denied (as at step 534), the caller is offered an option to bill the call another way, process steps for which are shown in FIG. 6, now referred to. Initially, the caller is asked to make some indication that there is a desire to bill the call another way. For example, the caller may be asked at step 600 to enter a "1" from the telephone keypad if he wants to bill some other way or to another number. Then, at step 602, the system looks for entry of a "1", which, if detected, simply returns processing to the Restart point of FIG. 2C. If, however, a "1" is not detected, the system looks to see whether the caller remains on the line or not, whether a request for a live operator has been made or not, and whether an excessive number of re-tries have been made or not (steps 604–606, respectively). If the caller has hung up or there are excessive re-tries, the caller line is simply dropped at steps 608 and 609, respectively (although appropriate messages may be played to the caller in such cases before the disconnect). If a request is made for a live operator, the transfer is made via steps 611 and 612.

An example of a process according to the invention for alternatively billing calls to a credit card is shown in FIG. 7. Here, it is to be understood that to initiate the call, the caller, or user, will have entered the telephone number to be called and the credit card number against which the call is sought to be billed.

The first step 700 is to check the property record to see if the subscriber or property record holder allows this particular type of credit card calls. Those of skill in the art will recognize that various kinds of charge card calling are known, and that, for example, a call may be sought to be billed against a commercial card (e.g., Visa, Mastercard) or against a card issued by one of the regional telephone companies. The invention, and the process of FIG. 7, are adaptable for use with all such cards, and it may be an option offered to the subscriber, reflected in the particular property record, to allow calls to be billed against some cards but not others. In the illustrated call flow, if the property record does not show that card calls are allowed, the caller is given a message to that effect at 701 and returned to the Restart point of the overall process.

If the property allows card calls, the caller is prompted to enter an expiration date for the card at step 703 followed by enablement of DTMF collection at 705. A series of steps, similar to ones discussed above, are implemented to determine if there is a time-out with silence, if a "*" key has been entered for digit clearance, or if a live operator's help is requested. These combined steps are shown at block 707. An appropriate response is incurred in each case as also was discussed above in the case of collect and third party alternative billing.

The expiration date is checked at step 709, and if found to be invalid a re-try counter is checked at step 711, which, if exceeded causes the caller to be transferred to a live operator at 713. Validation of the expiration date is by way of the validation databases discussed above in connection with FIG. 1. If the card date has not lapsed, the system checks at step 715 to see if the caller remains on the line. If not, the caller line is dropped.

With the caller still on the line, the system will advise the caller at step 717 to enter his or her Zip code. That is for further validation of the caller's authority to charge calls against the card number. Again, at this point, although not specifically illustrated, steps may be inserted to confirm that the caller remains on the line, to handle operator requests and such other things as requests for digit clearance and excessive re-tries. The system then checks at 719 to see if the entered Zip code is valid for the charge card. If not, a retry counter is checked at step 721 to either recycle to step 717 to again request entry of the Zip code or to transfer to manual at 723, depending on whether the counter threshold is exceeded or not.

If the Zip code is found to be valid, a billing number screening test is made of the credit card number at step 725. This is also, as discussed above, preferably against a negative database file so that if the number is found, steps may be taken to deny alternative billing of the call to the entered card number. If it is determined in either of the following steps, 727 or 728, respectively, that the card number is either in the data base or it does not pass the overall validation requirements, a script is played to the caller at step 731 advising that the entered card number cannot be billed against. The system processing may also be caused at this point to make other checks on the entered credit card number for controlling fraudulent card use. For example, although not specifically illustrated, an assessment can be made as to whether the card is "hot" or not, or whether it is on a list of lost or stolen credit cards, etc. Those of skill in the art will recognize the opportunity to implement these kinds of specific processing steps within the overall process flow.

In any case, once the caller is advised that a call cannot be billed against the card number, at step 731, a validation count register is checked at step 733 to see if the count is greater than one. If not, the caller is offered an opportunity at step 735 to reenter the card number from which the process returns to the Billing Recollect processing point 260 shown on FIG. 2A. If, on the other hand, the validation count is greater than one at step 733, the card calling option is removed from the options available to callers at step 737 and the process returns to the new billing option part of the process illustrated by FIG. 6.

With final acceptance and validation of the card number at step 728, the telephone number is then dialed out by the system at 739 and the call is then released back to the network at step 740. Processing by the system according to the invention is complete for that call.

In FIG. 8, more detailed processing steps are shown for implementing the language selection menu which is included as part of the main routine and which is shown in FIG. 2A as the language subroutine 220. Initially, at step 800, the DTMF detection capability is set to listen for language menu options. The system then causes a vocal recitation of the menu of languages available (step 802) so that one of them can be chosen as the one to be used for vocal interactions with the caller or user of the system. Next, at 804, it is determined whether or not a selection has been made. If a selection has been made, the language settings are changed accordingly (step 806), following which the DTMF detection is set to listen (step 810) for entry of billing menu options. The system provides an appropriate response to the user in the new language (e.g., the equal of "Thank you" at 812) and processing is returned from the subroutine.

If no language option is detected at step 804, a check 814 is made to see if there is a time-out with silence, and if so, a test 816 is made to see if there have been excessive retries. If not, a recycle to the language menu causes it to be played again at step 802. If, however, the number of re-tries exceed a preset threshold, the call is transferred to live operator for handling at step 817. Similarly, if a time-out with silence does not occur at step 814, steps 818 and 820 are implemented to determine if there is, first, a request for an operator by entry of a "0" from the caller, and second, if there have been excessive re-tries at use based on some apparent inputs from the caller detected at step 814. In the first case, the call is transferred to a live operator via step 817; in the second case the call is also transferred if the re-try threshold is exceeded. Otherwise (i.e., the threshold is not exceeded), the caller is re-presented with the language menu at 802 and processing resumes again from there. The transfer, and all language service, is seamless in the sense that call processing stays in the same language when crossing from automatic processing to live operator processing, and vice versa.

While the foregoing has described a preferred form of the invention, those of skill in the art will recognize that various modifications and adaptations may be made therein without deviating from the scope of the invention. For example, while much of the processing has been described in a generally sequential fashion, those of skill in the art will recognize than many operations and processing steps can be carried out substantially simultaneously or in an order different from that specifically described. It is intended that the following claims shall cover all such modifications and embodiments which fall within the inventive concept.

The invention claimed is:

1. A system for automatically processing telephone calls sought to be placed by a caller from a telephone under caller selectable alternative billing options, comprising:
   (a) automatic response means for receiving from a network telephone calls for which alternative billing are sought, for processing said calls in accordance with the caller selectable alternative billing options, and for releasing the calls back to the network after processing for call completion, said automatic response means being operative to allow the caller to select from said alternative billing options and to process a selected option and said automatic response means including (i) a voice response portion for accepting call-related inputs and for providing responses thereto, and (ii) a call processing portion interactive with the voice response portion for controlling progression of call processing;
   (b) call control means interconnected to the automatic response means for receiving calls from the network whereby each call includes call parameters indicative of a call type, said call control means further examining the call parameters before directing at least one type of calls to said automatic response means; and
   (c) database means accessible by the automatic response means for each call processed by said call control means to provide data to said call control means specifying processing features for each alternative billing option, such features being defined for such call by the call parameters therefor.

2. The system of claim 1 wherein the call parameters for each call for which alternative billing is sought include parameter dam indicative of a subscriber who subscribes services provided by said system, and the features specified by the database means include customization features preselected by the subscriber.

3. The system of claim 2 wherein the call control means includes an automatic call distributor (ACD) interfaced to an applications processor adapted to receive the call parameters via the ACD and to cause the ACD to direct calls to said automatic response means.

4. The system of claim 2 or 3 wherein the alternative billing option is selected by the caller from a group consisting of collect call billing, billing to a third party, and billing to a credit card.

5. The system of claim 4 wherein the subscriber customization features are selected from a group consisting of (i) playing music to a caller during interludes in call processing, (ii) customized greetings, and (iii) a spoken language for vocalized portions of call processing.

6. The system of claim 5 wherein the call control means is connected to the automatic response means by a first local area network and the database means is accessible to the automatic response means by a second local area network.

7. The system of claim 6 wherein said automatic response means presents the caller with a menu of the caller selectable alternative billing options and to accept DTMF signal inputs as indicative of selections therefrom by the caller and as indicative of at least information by the caller for call processing.

8. The system of claim 6 wherein said automatic response means presents the caller with a menu of the caller selectable alternative billing options and the system further includes voice recognition means adapted to recognize and accept vocal inputs from the caller as indicative of selections from the menu by the caller and as indicative of at least input information by the caller for call processing.

9. A method providing callers with customized automated telephone operator services for selected types of telephone calls, comprising the steps of:

(a) directing a call for which operator services are sought by a caller through a telephone network to an automated operator center from which such services are provided, said call including call parameters which define a call type for the call;

(b) at said automated operator center, examining the call parameters for the call and determining therefrom whether automated telephone operator services are to be provided for the call;

(c) directing the call to an automated response unit if it is determined that automated telephone operator services are to be provided for the call;

(d) providing the caller with a menu of automated services for which the caller has the option of selecting at least one service for use;

(e) further examining the call parameters and determining therefrom which features, if any, of a plurality of call processing features will be used for automated processing of said call, said determined features being preselected by a subscriber for such automated operator services; and (f) processing the call in accordance with said preselected features to provide a service selected for use by the caller.

10. The method of claim 9 including the further step of providing the caller with a menu of attributes from which the caller may select at least one attribute according to which the service selected by the caller will be processed.

11. The method of claim 10 wherein the menu of attributes is a menu of languages and the call is processed in the language selected by the caller.

12. The method of claim 9 wherein the menu of automated services includes a service for placing collect calls, a service for billing calls to a third party telephone number, and a service for billing calls to a credit card account.

13. The method of claim 9 or 12 wherein the plurality of call processing features includes processing a call in a preselected spoken language, processing a call with customized greetings, and processing a call to play music to the caller during processing interludes.

14. The method of claim 12 wherein prior to completion of the call for any available service, approval is sought for alternatively billing the call in accordance with the selected service, and in the event such approval is unavailable the caller is again offered the menu of services for reselecting a service therefrom.

15. A method for providing a telephone caller with automated operator services having customized features preselected by a subscriber for such services, comprising the steps of:

(a) routing a call for which operator services are sought to an automated operator facility, said call being accompanied by call parameters indicative of call characteristics;

(b) causing a menu of available operator services to be presented to the caller;

(c) receiving at least one menu selection from the caller as an indication of a menu-listed service to be used;

(d) using the call parameters to retrieve a record containing the customized features preselected by the subscriber as applicable to the operator service selected from the menu; and (e) automatically processing the call in accordance with the preselected customized features therefor to provide the selected operator service.

* * * * *